United States Patent [19]
Peterson

[11] 4,410,022
[45] Oct. 18, 1983

[54] ROUTER HARNESS

[76] Inventor: Laurence A. Peterson, 17826 State Line, Lansing, Ill. 60438

[21] Appl. No.: 374,159

[22] Filed: May 3, 1982

[51] Int. Cl.³ .............................................. B27C 5/10
[52] U.S. Cl. .................................... 144/1 F; 83/471.2; 144/134 D; 409/182
[58] Field of Search ...................... 83/761, 574, 471.3, 83/471.2; 144/134 B, 1 E, 1 F, 134 R, 134 P, 134 D, 136 R, 136 C; 409/182, 79, 218

[56] References Cited

U.S. PATENT DOCUMENTS

| | | | |
|---|---|---|---|
| 1,958,203 | 5/1934 | Pfau | 144/134 |
| 2,672,170 | 3/1954 | Johnson | 144/1 F |
| 3,099,298 | 7/1963 | Bellini | 144/1 F |
| 3,738,214 | 6/1973 | Wilson | 144/134 B |
| 3,923,086 | 12/1975 | Spohn, Jr. | 144/134 B |
| 4,084,629 | 4/1978 | Kreusler | 144/134 D |
| 4,185,671 | 1/1980 | Cotton | 144/134 D |
| 4,312,391 | 1/1982 | Snow | 144/1 F |

*Primary Examiner*—W. D. Bray
*Attorney, Agent, or Firm*—Neuman, Williams, Anderson & Olson

[57] ABSTRACT

A router harness for securedly and slidably mounting a hand-operated router to the track of a support arm of a standard radial saw, without removal of the saw. The additional support and positional alignment capabilities of the support arm are advantageously employed to provide an economical overhead router with increased precision control of position in the work plane and depth of cut.

12 Claims, 3 Drawing Figures

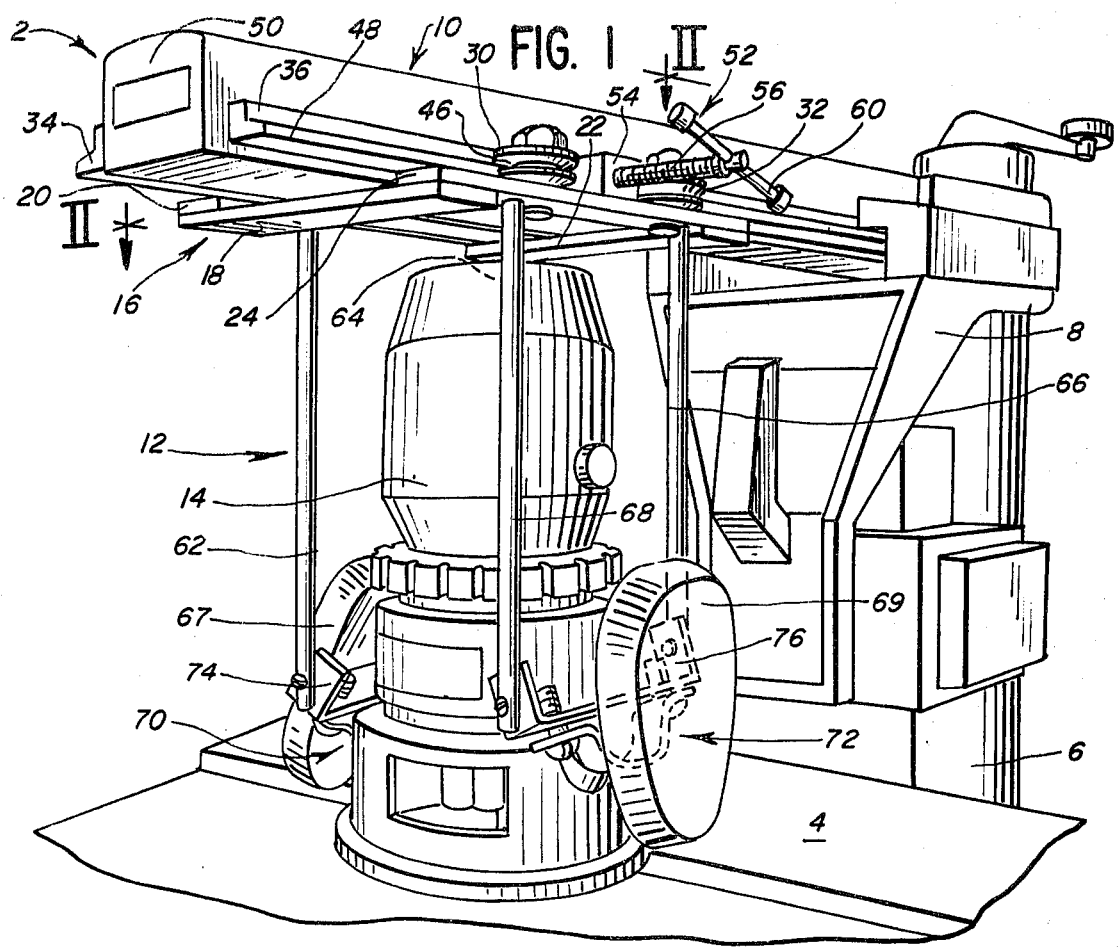
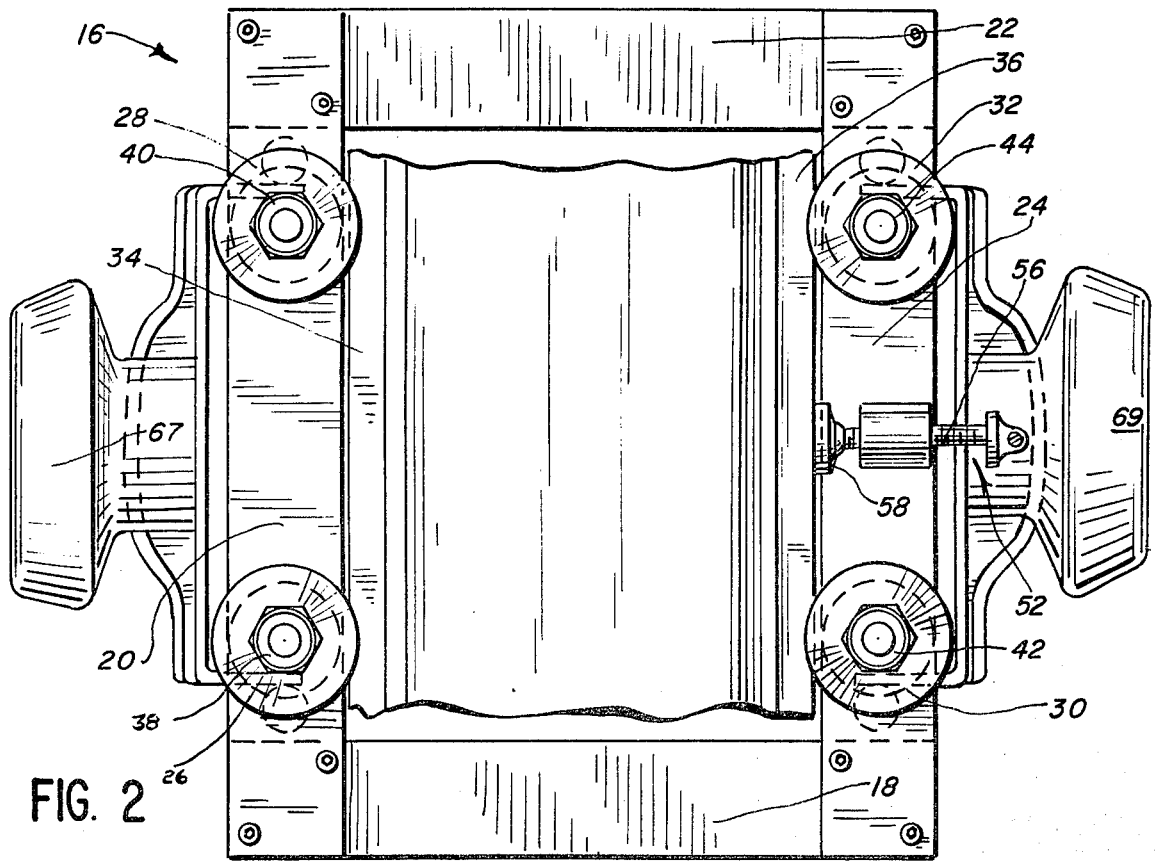

ROUTER HARNESS

BACKGROUND OF THE INVENTION

This invention relates generally to mounting harnesses for power tools. More particularly it relates to a mounting harness adapted to connect a hand-operated router to the support arm of a standard radial arm saw, without removal of the saw. The additional support and positional alignment capabilities of the support arm are thereby advantageously employed, resulting in precise control of position in the work plane and precise control of depth of cut.

A conventional radial saw includes a horizontal support arm, with a track therealong, which is positionally adjustable with respect to a fixed vertical column. Heretofore, the general concept of mounting power driven tools, aside from the normally mounted saw, to the horizontal support arm of such a radial saw has been known. A structural frame clamp for positioning and attaching a router to a radial saw in order to enable a user to accomplish overhead routing operations is the subject of U.S. Pat. No. 4,084,629, issued to Kreusler on Apr. 18, 1978. The Kreusler patent teaches the attachment of a hand-held router to a radial saw arm without the removal of the saw by clamping the router onto the radial saw arm using a structural frame which is not adapted for easy rolling or sliding movement of the router on the radial saw arm. In accordance with the Kreusler patent, movement of the router along the axis of the radial saw arm necessitates unclamping the entire structural frame and router combination, repositioning the structural frame and router combination at the desired location and reclamping the structural frame to the radial saw arm.

Movement of the router along the radial saw arm using the Kreusler development is time consuming and inconvenient due to the fact that the structural frame members supporting the hanging router are fixedly clamped to the radial saw arm and do not provide for rolling movement thereon. Furthermore, the router is retained by the structural frame using a collar portion and a compression band which inherently are not the most efficient means for counter-acting the rotational moment of an operating router. If the rotational moment is insufficiently restrained it can result in damage to the router occasioned by slippage and can jeopardize the safety of the operator.

SUMMARY OF THE INVENTION

It is an object of the present invention to overcome the deficiencies experienced with prior mounting harnesses. More specifically, it is an object to provide a router harness for mounting a conventional hand-operated router to the track of a standard radial saw support arm which is simple in construction and operation, while being superior to prior art devices with respect to performance and safety.

It is another object of this invention to provide a router harness for mounting a hand-operated router to the track of a standard radial saw arm and assure quick and secured locking of the rollable or easily slidable harness with respect to the radial saw arm.

It is still another object of this invention to provide a router harness for mounting a hand-operated router to the track of a standard radial saw arm and to anchor the router to the harness so as to effectively counter-act the rotational moment of the operating router, thereby eliminating the possibility of damage to the router occasioned by slippage and ensuring safer operation of a properly restrained power tool.

It is still another object of this invention to provide a router harness for mounting a hand-operated router to the track of a standard radial saw arm creating a third tool possessing the characteristics of three dimensional freedom of movement of the router, precise control of position in the work plane and precise control of depth of cut.

It is still another object of this invention to provide a router harness for securely mounting a hand-operated router to the track of a standard radial saw arm while permitting efficient removal of the router from the harness for separate use.

It is yet another object to provide an overhead mounted router harness which can be economically and effectively used by owners of radial arm saws and hand-operated routers.

These and other objects of the invention will be apparent hereinafter from the specification which describes the best mode of practicing the invention as currently known, its use and operation, and a preferred embodiment. Reference should also be made to the drawings, which constitute a part of the disclosure, and the subject matter claimed.

Generally, the objects of the present invention are accomplished in a router harness for use with a radial saw arm which allows the owner of a hand-operated router and a radial saw arm to combine both tools to create a third tool. The third tool is an overhead mounted router possessing the characteristics of three-dimensional freedom of movement of the router, precise control of depth of cut and controlled movement along the plane of the work piece.

The router harness is connected to the radial saw support arm by a bracket means which comprises a rectangular planar bracket formed into a substantially rigid frame or a plate. Roller means are employed to facilitate movement of the bracket along the longitudinal axis of the horizontal support arm. One pair of rollers is attached to either side of the top of the bracket so that the bracket rollably engages opposite sides of the radial saw arm. In the conventional radial saw support arm, track means in the form of rails or channels are provided for sliding movement of the saw housing. According to the present invention, the bracket is adapted for rolling engagement with the same track means upon which the saw itself is positioned. The bracket is preferably wider than the width of the radial saw arm allowing for the attachment of the pairs of grooved rollers. It has a predetermined length and can be manufactured from a strong but light-weight metal or other suitable material.

Connected to the bracket means is a support means. The support means consists of two or more laterally spaced members rigidly connected to and depending from the bracket means which form a receptacle cell for holding the router. In the preferred embodiment, two pairs of distending members are attached to the bottom of the bracket and together with the bracket form a cell sufficiently large to accommodate a router.

The router is secured to the support means with clamping means. Hinged between the lower ends of each pair of opposing distending members is a saddle-type clamp for receiving the router handles and clamping the router to the overall frame of the router harness.

The saddle-type clamps are capable of selectable hinged adjustments to accommodate varying size routers. Clamping the handles rather than using a collar clamp and compression band on the frame virtually assures that the rotational moment of an operating router will be opposed, thereby obviating damage to the router or injury to the operator occasioned by slippage. Attachment of the router harness to the router is accomplished by fixing the saddle-type clamps between each pair of opposing distending members according to the size of the router to be harnessed. Thereafter, the router handles are securely clamped. It will be appreciated that other clamping arrangements are within the scope of the invention described.

Registration means are provided in the form of a threaded rod engaged in a taped block member affixed to the top of the bracket means substantially perpendicular to the longitudinal axis of the support arm. The threaded rod is tightened to abutting relation with the support arm to releasably lock the bracket means in a desired axial position along the arm. When the threaded rod is loosened, the bracket means and support means integral therewith may be easily positioned along the arm and readily removed therefrom at its open end.

The router harness of this invention allows the owners of a hand-operated router and radial saw arm to efficiently and effectively create a third tool, namely, an overhead mounted router. The router harness is quickly attachable to or removable from the roller rails of the radial saw arm. This feature allows a speedy change of router bits for the work at hand and quick restoration of the radial saw arm to its use with a saw.

From the description thus far provided, it is apparent that the proposed router harness may be used with conventional hand-operated routers and conventional radial saws such as are well known in the art.

BRIEF DESCRIPTION OF THE DRAWINGS

For a more complete understanding of this invention, reference should now be made to the drawings, as briefly described below:

FIG. 1 is a perspective view of the router harness of this invention showing a router mounted in the harness and the harness mounted to the radial saw arm.

FIG. 2 is a top view, taken substantially along line II—II of FIG. 1, and illustrating the router harness of this invention with a router mounted in the harness.

DESCRIPTION OF THE PREFERRED EMBODIMENT

Figure 3:
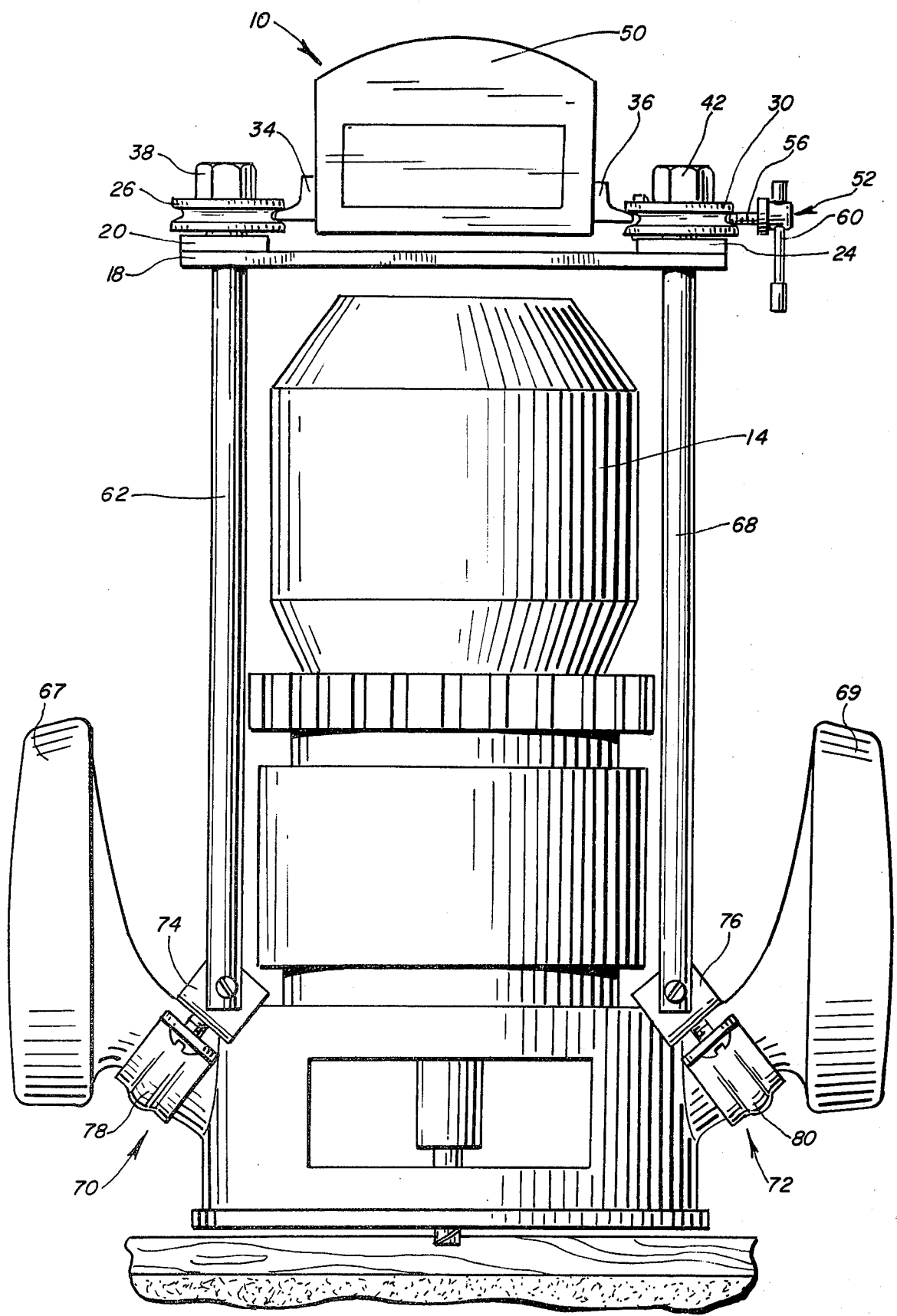
FIG. 3 is a front view of the router harness of this invention with a router mounted in the harness.

Referring now to FIG. 1, a conventional radial saw apparatus 2 is illustrated including a base 4, a standard 6, a saw housing 8 and a horizontal support arm 10. The router harness 12 is shown, with a router 14 clamped therein, movably mounted on support arm 10.

The illustrated bracket means 16 comprises a planar bracket formed by the joining of four substantially flat bars 18, 20, 22 and 24 in a rectangular configuration. Bars 18 and 22 are laterally spaced transverse to the longitudinal axis of support arm 10. Bars 20 and 24 are laterally spaced on opposite sides of support arm 10, and are orthogonal to bars 18 and 22. Bars 18 and 22 are wider than support arm 10. Bars 20 and 24 are of predetermined length. The four bars are riveted, welded or otherwise fastened to each other at their ends. It will be appreciated that equally suitable bracket members may be adapted for use in the present invention without material deviation from the scope of the concepts described herein.

Referring also to FIG. 2, and using like numbers to designate like items to assist in understanding the several views, the illustrated bracket means 16 can also be seen to include four rollers or wheels 26, 28, 30 and 32. These wheels operatively engage track means in the form of rails 34 and 36 which run coextensively along the sides of support arm 10. Wheels 26, 28, 30 and 32 are captively journalled on bolts 38, 40, 42 and 44 respectively. The radially disposed bearing surface of each wheel is shaped in conforming relation to the leading edge of the rail. Thus, for example, the bearing surface 46 of wheel 30 conforms to the leading edge 48 of rail 36. The contiguous relation of wheels 30 and 32 to rail 36 and of wheels 26 and 28 to rail 34 ensures smooth and steady horizontal movement of router harness 12 along support arm 10.

The wheels and rails also cooperate to hold the router harness 12 above the base 4 and the workpiece positioned thereon. It is therefore necessary that the bolts 38, 40, 42 and 44, or other suitable means for rotatably engaging wheels 26 and 28 and wheels 30 and 32 with rails 34 and 36, respectively, be sufficiently strong and lightweight so as to be capable of sustaining the weight of router harness 12 without substantially increasing that weight.

The bracket means 16 may be slidably positioned anywhere along the length of support arm 10 and may even be removed altogether at end 50 of support arm 10 to permit use of the saw in housing 8. Once selectively positioned, bracket means 16 is locked into place with registration means 52. Registration means 52 includes a tapped block member 54 fixed to the top of bracket means 16 preferably at the center of bar 24. Tapped block member 54 has receiving threads which are oriented perpendicular to support arm 10. A threaded rod 56 is mated with tapped block member 54 and may be adjusted into or out of contact with support arm 10. An abutment plate 58, is shown in FIG. 2, is slippably attached to and defines the securing end of threaded rod 56. When threaded rod 56 is loosened, bracket means 16 can be slidably rolled along rails 34 and 36. When threaded rod 56 is tightened against the support arm 10, bracket means 16 and consequently router harness 12 are locked into position. Adjustment of the threaded rod 56 is accomplished by turning a slip rod 60 disposed on the end opposite abutment plate 58.

Support means depend from the bracket means 16 and define a cell in which the router 14 is housed. The support means also facilitate the mounting of router 10 to router harness 12. In the preferred embodiment, distending members or columns 62, 64, 66 and 68 are attached to the bottom of the bracket means 16. The members 62, 64, 66 and 68 form a support structure and form a cell for the placement of the router 14, which is secured to bracket means 16 and distending members 62, 64, 66 and 68 through the use of clamping means in the form of two hinged, adjustable and oppositely disposed handle clamps 70 and 72 for gripping handles 67 and 69, respectively, of router 14.

Referring now to FIGS. 1 and 3, the handle clamps 70 and 72 each comprise a U-shaped bracket, 74 and 76 respectively, whose sides are selectively hinged and securely fastened between the distending columns. Bracket 74 is connected to members 62 and 64 and bracket 76 is connected to members 66 and 68. Selective hinging is provided to accommodate differences in router handle positioning as necessary for use of the invention with different router apparatus. Handle clamp 70 further comprises a saddle bracket 78 connected about router handle 67 to the U-shaped bracket 74. Handle clamp 72 further comprises a saddle bracket 80 connected about router handle 69 to U-shaped bracket 76. Any means of fastening U-shaped brackets 74 and 76 to saddle brackets 78 and 80, respectively, may be employed which permits quick release of seated and clamped router handles 67 and 69, while still securely fastening router 14 to the support means.

In combined operation, router 14 is clamped into router harness 12 by securing handle clamps 70 and 72 about router handles 67 and 69, respectively. Router harness 12 is then placed onto the forward end 50 of support arm 10 with wheels 26 and 28 and wheels 30 and 32 being rotatably engaged with rails 34 and 36, respectively, for selective positioning of router 14 along the longitudinal axis of support arm 10. Router harness 12 is locked into its desired position with registration means 52. Thus, a simple and economical mounting harness is provided for securing a hand-operated router to a conventional radial saw support structure to obtain a safe and effective overhead mounted router having three-dimensional freedom of movement and permitting precise control of depth of cut and controlled movement along the plane of the work piece.

It is believed that the embodiments herein illustrated and described accomplish all of the above-enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims.

What is claimed is:

1. A router harness for use with a radial arm saw assembly having a substantially horizontal support arm, said router harness comprising: bracket means coplanar with and operatively connected to said support arm for longitudinal movement therealong; support means integral with and depending from said bracket means, said support means defining a cell for storing a router therein; clamping means affixed to said support means for securing a router to said support means; and registration means mounted to said bracket means for selectively positioning and fixing said bracket means and support means integral therewith along said support arm.

2. The router harness of claim 1 wherein said bracket means comprises a substantially rectangular rigid metal frame having a predetermined length and a width greater than the width of said support arm.

3. The router harness of claim 1 wherein said bracket means comprises roller means operatively engageable with one or more faces of said support arm.

4. The router harness of claim 3 wherein said roller means comprises first and second rollers laterally spaced on opposite sides of said support arm, said first and second rollers rotatably mounted to said bracket means on axes transverse to the longitudinal axis of said support arm.

5. The router harness of claim 4 wherein said rollers have radially disposed bearing surfaces conforming to the contiguous faces of said support arm.

6. The router harness of claim 5 wherein said first and second rollers operatively engage track means affixed to said opposite sides of said support arm parallel to the longitudinal axis of said support arm and generally coextensive therewith.

7. The router harness of claim 6 wherein said rollers and track means cooperate to support said bracket means in vertically fixed, coplanar relation to the bottom horizontal face of said support arm.

8. The router harness of claims 1, 5 or 7 wherein said support means comprises two or more laterally spaced members rigidly connected at their first ends at substantially right angles to said bracket means and downwardly disposed for engagement at their second ends to a lower portion of a router disposed in said cell.

9. The router harness of claim 8 wherein said laterally spaced members are connected at their second ends to handles integral with such router.

10. The router harness of claim 8 wherein said clamping means comprises two saddle-type clamps, said clamps each being hingedly connected to said second ends of said laterally spaced members and positioned for adjustable clamping of said router handles for efficiently and securely mounting said router to said support means.

11. The router harness of claim 1 wherein said clamping means comprises two saddle-type clamps, said clamps each being hingedly connected to said support means and positioned for adjustable clamping of handles integral with such router for efficiently and securely mounting said router to said support means.

12. The router harness of claims 1, 5, 7 or 11 wherein said registration means for selectively positioning and fixing said bracket means and support means integral therewith comprises a threaded rod engaged in a tapped block member affixed to said bracket means and substantially perpendicular to the longitudinal axis of said support arm, said threaded rod adapted for screwing in and out of abutting relation with the face of said support arm for releasably locking said bracket means into selected positions along said support arm.

* * * * *